US010193700B2

(12) United States Patent
Liu et al.

(10) Patent No.: US 10,193,700 B2
(45) Date of Patent: Jan. 29, 2019

(54) TRUST-ZONE-BASED END-TO-END SECURITY

(71) Applicant: Samsung Electronics Co., Ltd, Suwon-si (KR)

(72) Inventors: An Liu, Mountain View, CA (US); Balakrishna Venkataram, Mountain View, CA (US); Pai Peng, Mountain View, CA (US); Bulent Kasman, Mountain View, CA (US); Kunal Patel, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 156 days.

(21) Appl. No.: 15/054,020

(22) Filed: Feb. 25, 2016

(65) Prior Publication Data
US 2016/0254918 A1 Sep. 1, 2016

Related U.S. Application Data

(60) Provisional application No. 62/126,121, filed on Feb. 27, 2015, provisional application No. 62/209,125, filed on Aug. 24, 2015.

(51) Int. Cl.
*H04L 9/32* (2006.01)
*H04W 12/06* (2009.01)
*H04L 29/06* (2006.01)

(52) U.S. Cl.
CPC .......... *H04L 9/3268* (2013.01); *H04L 9/3213* (2013.01); *H04L 9/3265* (2013.01); *H04L 63/0823* (2013.01); *H04W 12/06* (2013.01)

(58) Field of Classification Search
CPC ... H04L 9/3213; H04L 9/3265; H04L 9/3268; H04L 9/3247; H04L 63/0823; H04L 63/0428; H04W 12/06
(Continued)

(56) References Cited

U.S. PATENT DOCUMENTS

| 5,784,463 A | 7/1998 | Chen et al. |
| 6,357,006 B1 | 3/2002 | Pham et al. |

(Continued)

FOREIGN PATENT DOCUMENTS

| AU | 2015 200 102 A1 | 2/2015 |
| CN | 101919303 B | 11/2013 |

(Continued)

OTHER PUBLICATIONS

International Search Report dated Jun. 17, 2016 in connection with International Patent Application No. PCT/KR2016/002009.

(Continued)

*Primary Examiner* — Shanto Abedin

(57) ABSTRACT

Methods, electronic devices, and systems for exchanging encrypted information. A method for exchanging encrypted information by an electronic device includes generating one or more device certificates and one or more device public private key pairs. The one or more device certificates are signed using a device unique private key that is pre-stored on the electronic device. The method also includes sending the one or more device certificates to a server of a token service provider (TSP). The method further includes receiving one or more TSP certificates from the TSP server. The method includes identifying one or more TSP public keys of the TSP server based on the one or more received TSP certificates. Additionally, the method includes transmitting a message including the information encrypted based on the one or more identified TSP public keys and a signature of the electronic device.

14 Claims, 7 Drawing Sheets

(58) Field of Classification Search
USPC .................. 713/156, 175; 705/67, 75, 76
See application file for complete search history.

(56) References Cited

U.S. PATENT DOCUMENTS

| | | |
|---|---|---|
| 7,743,254 B2 | 6/2010 | Sauve et al. |
| 7,767,430 B2 | 8/2010 | Neeser et al. |
| 7,865,577 B1 | 1/2011 | O'Neil et al. |
| 8,302,201 B1 | 10/2012 | Gupta et al. |
| 8,375,220 B2 | 2/2013 | Prakash et al. |
| 8,452,882 B2 | 5/2013 | Schneider |
| 8,489,067 B2 | 7/2013 | Rackley, III et al. |
| 8,533,803 B2 | 9/2013 | Cha |
| 8,621,075 B2 | 12/2013 | Luna |
| 8,628,012 B1 | 1/2014 | Wallner |
| 8,718,602 B2 | 5/2014 | Wu et al. |
| 8,732,451 B2 | 5/2014 | Viswanathan et al. |
| 8,744,914 B2 | 6/2014 | Mon et al. |
| 8,775,757 B2 | 7/2014 | Polzin et al. |
| 8,843,749 B2 | 9/2014 | Sauve et al. |
| 8,954,515 B2 | 2/2015 | Guo et al. |
| 8,966,268 B2 | 2/2015 | Marien |
| 8,977,567 B2 | 3/2015 | Aabye et al. |
| 9,008,618 B1 | 4/2015 | Fox |
| 9,022,285 B2 | 5/2015 | Graylin |
| 9,027,079 B2 | 5/2015 | Comay et al. |
| 9,055,314 B2 | 6/2015 | Yin et al. |
| 9,070,122 B1 | 6/2015 | Geller et al. |
| 9,077,543 B2 | 7/2015 | Luft et al. |
| 9,100,873 B2 | 8/2015 | Luna et al. |
| 9,112,703 B2 | 8/2015 | Wood et al. |
| 9,118,464 B2 | 8/2015 | Nix |
| 9,123,036 B2 | 9/2015 | Graylin et al. |
| 9,129,199 B2 | 9/2015 | Spodak et al. |
| 9,130,910 B1 | 9/2015 | Logue |
| 9,135,424 B2 | 9/2015 | Taveau et al. |
| 9,137,025 B2 | 9/2015 | Lambert |
| 9,161,196 B2 | 10/2015 | Ballantyne et al. |
| 9,161,225 B2 | 10/2015 | Pecen et al. |
| 9,166,953 B2 | 10/2015 | Luukkala et al. |
| 9,167,428 B2 | 10/2015 | Buntinx |
| 2002/0174068 A1 | 11/2002 | Marsot |
| 2002/0186845 A1 | 12/2002 | Dutta et al. |
| 2003/0217165 A1* | 11/2003 | Buch ............... H04L 29/06027 709/229 |
| 2004/0098352 A1 | 5/2004 | Matsuyama |
| 2005/0039054 A1 | 2/2005 | Satoh et al. |
| 2005/0138384 A1 | 6/2005 | Brickell et al. |
| 2005/0154886 A1 | 7/2005 | Birk et al. |
| 2006/0080550 A1 | 4/2006 | Awatsu et al. |
| 2006/0165060 A1 | 7/2006 | Dua |
| 2006/0200410 A1 | 9/2006 | Kelley et al. |
| 2006/0218403 A1 | 9/2006 | Sauve et al. |
| 2008/0155268 A1 | 6/2008 | Jazayeri et al. |
| 2008/0182592 A1 | 7/2008 | Cha et al. |
| 2008/0320308 A1 | 12/2008 | Kostiainen et al. |
| 2008/0320566 A1* | 12/2008 | Herzog ............... G06F 21/33 726/4 |
| 2009/0114716 A1 | 5/2009 | Ramachandran |
| 2009/0156213 A1 | 6/2009 | Spinelli et al. |
| 2009/0159663 A1 | 6/2009 | Mullen et al. |
| 2009/0171836 A1 | 7/2009 | Olliphant et al. |
| 2009/0307132 A1 | 12/2009 | Phillips |
| 2010/0082991 A1 | 4/2010 | Baldwin et al. |
| 2010/0088188 A1 | 4/2010 | Kumar et al. |
| 2010/0117794 A1 | 5/2010 | Adams et al. |
| 2010/0138912 A1 | 6/2010 | Bauchot et al. |
| 2010/0216429 A1 | 8/2010 | Mahajan |
| 2010/0217989 A1 | 8/2010 | Sauve et al. |
| 2010/0242110 A1 | 9/2010 | Louch et al. |
| 2011/0022835 A1* | 1/2011 | Schibuk ............... G06Q 20/382 713/153 |
| 2011/0082737 A1 | 4/2011 | Crowe et al. |
| 2011/0099112 A1 | 4/2011 | Mages et al. |
| 2011/0106674 A1 | 5/2011 | Perlman |
| 2011/0191244 A1 | 8/2011 | Dai |
| 2011/0214158 A1 | 9/2011 | Pasquero et al. |
| 2011/0239304 A1 | 9/2011 | Saarisalo |
| 2011/0246315 A1 | 10/2011 | Spies et al. |
| 2011/0289006 A1 | 11/2011 | Hutchison et al. |
| 2011/0314538 A1 | 12/2011 | Huang et al. |
| 2011/0320314 A1 | 12/2011 | Brown |
| 2011/0320345 A1 | 12/2011 | Taveau et al. |
| 2012/0024947 A1 | 2/2012 | Naelon |
| 2012/0074217 A1 | 3/2012 | Block et al. |
| 2012/0101939 A1 | 4/2012 | Kasower |
| 2012/0101951 A1 | 4/2012 | Li et al. |
| 2012/0149331 A1 | 6/2012 | Wu et al. |
| 2012/0149332 A1 | 6/2012 | Wu et al. |
| 2012/0150742 A1 | 6/2012 | Poon et al. |
| 2012/0166795 A1 | 6/2012 | Wood et al. |
| 2012/0171992 A1 | 7/2012 | Cheong et al. |
| 2012/0216244 A1 | 8/2012 | Kumar et al. |
| 2012/0221467 A1 | 8/2012 | Hamzeh et al. |
| 2012/0231844 A1 | 9/2012 | Coppinger |
| 2012/0254290 A1 | 10/2012 | Naaman |
| 2012/0254624 A1 | 10/2012 | Malkhasyan et al. |
| 2012/0290449 A1 | 11/2012 | Mullen et al. |
| 2012/0316992 A1 | 12/2012 | Oborne |
| 2012/0317370 A1 | 12/2012 | Luna |
| 2012/0330843 A1 | 12/2012 | Von Mueller et al. |
| 2013/0013480 A1 | 1/2013 | Venter |
| 2013/0031374 A1 | 1/2013 | Thom et al. |
| 2013/0042111 A1 | 2/2013 | Fiske |
| 2013/0124349 A1 | 5/2013 | Khan et al. |
| 2013/0124420 A1* | 5/2013 | Duri ............... G06Q 20/382 705/53 |
| 2013/0139230 A1 | 5/2013 | Koh et al. |
| 2013/0141567 A1 | 6/2013 | Walker et al. |
| 2013/0159186 A1 | 6/2013 | Brudnicki et al. |
| 2013/0168450 A1 | 7/2013 | von Mueller et al. |
| 2013/0208893 A1 | 8/2013 | Shablygin et al. |
| 2013/0226812 A1 | 8/2013 | Landrok et al. |
| 2013/0294250 A1 | 11/2013 | Berelejis et al. |
| 2013/0305392 A1 | 11/2013 | Bar-El et al. |
| 2013/0317928 A1 | 11/2013 | Laracey |
| 2013/0325712 A1 | 12/2013 | Park et al. |
| 2013/0332740 A1 | 12/2013 | Sauve et al. |
| 2013/0340064 A1 | 12/2013 | Kostiainen et al. |
| 2013/0347064 A1 | 12/2013 | Aissi |
| 2014/0007215 A1 | 1/2014 | Romano et al. |
| 2014/0013406 A1 | 1/2014 | Tremlet |
| 2014/0025520 A1 | 1/2014 | Mardikar et al. |
| 2014/0040126 A1 | 2/2014 | Andrews et al. |
| 2014/0058935 A1 | 2/2014 | Mijares |
| 2014/0068744 A1 | 3/2014 | Bran et al. |
| 2014/0095286 A1 | 4/2014 | Drewry et al. |
| 2014/0095865 A1 | 4/2014 | Yerra et al. |
| 2014/0096226 A1 | 4/2014 | Barkan |
| 2014/0101034 A1 | 4/2014 | Tanner et al. |
| 2014/0101048 A1 | 4/2014 | Gardiner et al. |
| 2014/0101679 A1* | 4/2014 | Yin ............... H04N 21/4623 725/5 |
| 2014/0114860 A1 | 4/2014 | Ozvat et al. |
| 2014/0115125 A1 | 4/2014 | Chen |
| 2014/0122328 A1 | 5/2014 | Grigg |
| 2014/0122873 A1* | 5/2014 | Deutsch ............... H04L 63/20 713/158 |
| 2014/0149198 A1 | 5/2014 | Kim et al. |
| 2014/0156534 A1 | 6/2014 | Quigley et al. |
| 2014/0172597 A1 | 6/2014 | Spies et al. |
| 2014/0180931 A1 | 6/2014 | Lie et al. |
| 2014/0181962 A1 | 6/2014 | Seo et al. |
| 2014/0183269 A1 | 7/2014 | Glaser |
| 2014/0191028 A1 | 7/2014 | Laracey |
| 2014/0222688 A1 | 8/2014 | Haggerty et al. |
| 2014/0244494 A1 | 8/2014 | Davis et al. |
| 2014/0246490 A1 | 9/2014 | Graylin |
| 2014/0249948 A1 | 9/2014 | Graylin et al. |
| 2014/0258110 A1 | 9/2014 | Davis et al. |
| 2014/0258132 A1 | 9/2014 | Swamy et al. |
| 2014/0269946 A1 | 9/2014 | Wallner |
| 2014/0279437 A1 | 9/2014 | Lee et al. |
| 2014/0281500 A1 | 9/2014 | Ignatchenko |

(56) References Cited

U.S. PATENT DOCUMENTS

| | | | |
|---|---|---|---|
| 2014/0282878 A1 | 9/2014 | Ignatchenko et al. | |
| 2014/0283006 A1 | 9/2014 | Korkishko et al. | |
| 2014/0289130 A1* | 9/2014 | Savolainen | G06Q 20/202 705/71 |
| 2014/0317686 A1 | 10/2014 | Vetillard | |
| 2014/0344155 A1 | 11/2014 | Liu et al. | |
| 2014/0358794 A1 | 12/2014 | Finley | |
| 2014/0364099 A1 | 12/2014 | Pai et al. | |
| 2014/0370851 A1 | 12/2014 | Wang et al. | |
| 2014/0372293 A1 | 12/2014 | Leung et al. | |
| 2014/0372299 A1 | 12/2014 | Singh et al. | |
| 2014/0372300 A1 | 12/2014 | Blythe | |
| 2015/0004934 A1 | 1/2015 | Qian et al. | |
| 2015/0006392 A1 | 1/2015 | Brand et al. | |
| 2015/0006404 A1* | 1/2015 | Beidl | H04L 63/062 705/71 |
| 2015/0012427 A1 | 1/2015 | Phillips et al. | |
| 2015/0012439 A1 | 1/2015 | Sakurai et al. | |
| 2015/0020160 A1 | 1/2015 | Goncalves et al. | |
| 2015/0032524 A1 | 1/2015 | Fisher | |
| 2015/0032635 A1 | 1/2015 | Guise | |
| 2015/0039494 A1 | 2/2015 | Sinton et al. | |
| 2015/0046339 A1 | 2/2015 | Wong et al. | |
| 2015/0072726 A1 | 3/2015 | Stern | |
| 2015/0081554 A1 | 3/2015 | Wong et al. | |
| 2015/0082025 A1* | 3/2015 | Deshpande | H04L 9/0847 713/155 |
| 2015/0100788 A1 | 4/2015 | Chastain et al. | |
| 2015/0134439 A1 | 5/2015 | Maxwell et al. | |
| 2015/0163222 A1 | 6/2015 | Pal | |
| 2015/0178732 A1 | 6/2015 | Laracey | |
| 2015/0200774 A1 | 7/2015 | Le Saint | |
| 2015/0201322 A1 | 7/2015 | Kim et al. | |
| 2015/0229477 A1* | 8/2015 | Blair | H04L 9/3247 713/156 |
| 2015/0235204 A1 | 8/2015 | Wallner | |
| 2015/0235290 A1 | 8/2015 | Boemi et al. | |
| 2015/0254636 A1 | 9/2015 | Yoon et al. | |
| 2015/0264024 A1 | 9/2015 | Frank | |
| 2015/0269582 A1 | 9/2015 | Simmons | |
| 2015/0287018 A1 | 10/2015 | Iqbal et al. | |
| 2015/0287029 A1 | 10/2015 | Park et al. | |
| 2015/0302201 A1* | 10/2015 | Ryu | G06Q 20/382 726/22 |
| 2015/0302396 A1 | 10/2015 | Jeon | |
| 2015/0348026 A1 | 12/2015 | Roberts et al. | |
| 2015/0381369 A1* | 12/2015 | Broumas | H04L 9/3228 713/176 |
| 2016/0092876 A1 | 3/2016 | Kamal et al. | |
| 2016/0162893 A1 | 6/2016 | Kamal et al. | |
| 2016/0253651 A1 | 9/2016 | Park et al. | |
| 2016/0253652 A1 | 9/2016 | Je et al. | |
| 2016/0381725 A1 | 12/2016 | Spinelli et al. | |

FOREIGN PATENT DOCUMENTS

| | | |
|---|---|---|
| CN | 103500404 A | 1/2014 |
| CN | 104050559 A | 9/2014 |
| EP | 0949595 A2 | 10/1999 |
| EP | 1 176 844 A3 | 1/2002 |
| EP | 2515472 A1 | 10/2012 |
| EP | 2856407 A | 11/2013 |
| JP | 2002278939 A | 9/2002 |
| JP | 2005062556 A | 3/2005 |
| JP | 2010224807 A | 10/2010 |
| JP | 2014128028 A | 7/2014 |
| KR | 20030009830 A | 2/2003 |
| KR | 10-0646350 B1 | 11/2006 |
| KR | 20110019887 A | 3/2011 |
| KR | 20110032735 A | 3/2011 |
| KR | 20110112594 A | 10/2011 |
| KR | 20110137033 A | 12/2011 |
| KR | 20120046376 A | 5/2012 |
| KR | 20120094544 A | 8/2012 |
| KR | 20130083029 A | 7/2013 |
| KR | 20130089902 A | 8/2013 |
| KR | 20130125344 A | 11/2013 |
| KR | 20130142864 A | 12/2013 |
| KR | 20140068443 A | 6/2014 |
| KR | 20140079960 A | 6/2014 |
| KR | 20140096208 A | 8/2014 |
| KR | 10-2014-0112785 A | 9/2014 |
| KR | 20140117105 A | 10/2014 |
| KR | 20140133240 A | 11/2014 |
| KR | 10-2015-0019956 A | 2/2015 |
| KR | 20150097325 A | 8/2015 |
| KR | 20150104700 A | 9/2015 |
| KR | 20150141321 A | 12/2015 |
| WO | 2006035421 A2 | 4/2006 |
| WO | 2006103383 A1 | 10/2006 |
| WO | 2010039337 A2 | 4/2010 |
| WO | WO 2012/068094 A1 | 5/2012 |
| WO | 2012-091349 A2 | 7/2012 |
| WO | 2013166185 A1 | 11/2013 |
| WO | 2014-081073 A1 | 5/2014 |
| WO | 2014149498 A2 | 9/2014 |
| WO | 2014/189569 A1 | 11/2014 |
| WO | 2015/004677 A1 | 1/2015 |

OTHER PUBLICATIONS

Written Opinion of the International Searching Authority dated Jun. 17, 2016 in connection with International Patent Application No. PCT/KR2016/002009.

The International Searching Authority, "International Search Report," International Patent Application No. PCT/KR2016/002020, dated Jul. 1, 2016, 3 pages, publisher The ISA/KR, International Application Division, Korean Intellectual Property Office, Daejeon, Republic of Korea.

The International Searching Authority, "Written Opinion," International Patent Application No. PCT/KR2016/002020, dated Jul. 1, 2016, 6 pages, publisher The ISA/KR, International Application Division, Korean Intellectual Property Office, Daejeon, Republic of Korea.

The International Searching Authority, "International Search Report," International Patent Application No. PCT/KR2016/001969, dated Jun. 16, 2016, 3 pages, publisher The ISA/KR, International Application Division, Korean Intellectual Property Office, Daejeon, Republic of Korea.

The International Searching Authority, "Written Opinion," International Patent Application No. PCT/KR2016/001969, dated Jun. 16, 2016, 6 pages, publisher The ISA/KR, International Application Division, Korean Intellectual Property Office, Daejeon, Republic of Korea.

The International Searching Authority, "International Search Report," International Patent Application No. PCT/KR2016/001233, dated May 23, 2016, 4 pages, publisher The ISA/KR, International Application Division, Korean Intellectual Property Office, Daejeon, Republic of Korea.

The International Searching Authority, "Written Opinion," International Patent Application No. PCT/KR2016/001233, dated May 23, 2016, 9 pages, publisher The ISA/KR, International Application Division, Korean Intellectual Property Office, Daejeon, Republic of Korea.

The International Searching Authority, "International Search Report," International Patent Application No. PCT/KR2016/001917, dated Jun. 13, 2016, 3 pages, publisher The ISA/KR, International Application Division, Korean Intellectual Property Office, Daejeon, Republic of Korea.

The International Searching Authority, "Written Opinion," International Patent Application No. PCT/KR2016/001917, dated Jun. 13, 2016, 5 pages, publisher The ISA/KR, International Application Division, Korean Intellectual Property Office, Daejeon, Republic of Korea.

The International Searching Authority, "International Search Report," International Patent Application No. PCT/KR2016/001941, dated

(56) References Cited

OTHER PUBLICATIONS

Jun. 16, 2016, 3 pages, publisher The ISA/KR, International Application Division, Korean Intellectual Property Office, Daejeon, Republic of Korea.
The International Searching Authority, "Written Opinion," International Patent Application No. PCT/KR2016/001941, dated Jun. 16, 2016, 4 pages, publisher The ISA/KR, International Application Division, Korean Intellectual Property Office, Daejeon, Republic of Korea.
The International Searching Authority, "International Search Report," International Patent Application No. PCT/KR2016/001968, dated Jun. 13, 2016, 3 pages, publisher The ISA/KR, International Application Division, Korean Intellectual Property Office, Daejeon, Republic of Korea.
The International Searching Authority, "Written Opinion," International Patent Application No. PCT/KR2016/001968, dated Jun. 13, 2016, 6 pages, publisher The ISA/KR, International Application Division, Korean Intellectual Property Office, Daejeon, Republic of Korea.
The International Searching Authority, "International Search Report," International Patent Application No. PCT/KR2016/001974, dated Jun. 15, 2016, 3 pages, publisher The ISA/KR, International Application Division, Korean Intellectual Property Office, Daejeon, Republic of Korea.
The International Searching Authority, "Written Opinion," International Patent Application No. PCT/KR2016/001974, dated Jun. 15, 2016, 7 pages, publisher The ISA/KR, International Application Division, Korean Intellectual Property Office, Daejeon, Republic of Korea.
The International Searching Authority, "International Search Report," International Patent Application No. PCT/KR2016/009357, dated Dec. 12, 2016, 3 pages, publisher The ISA/KR, International Application Division, Korean Intellectual Property Office, Daejeon, Republic of Korea.
The International Searching Authority, "Written Opinion," International Patent Application No. PCT/KR2016/009357, dated Dec. 12, 2016, 6 pages, publisher The ISA/KR, International Application Division, Korean Intellectual Property Office, Daejeon, Republic of Korea.
The International Searching Authority, "International Search Report," International Patent Application No. PCT/KR2016/009274, dated Dec. 8, 2016, 3 pages, publisher The ISA/KR, International Application Division, Korean Intellectual Property Office, Daejeon, Republic of Korea.
The International Searching Authority, "Written Opinion," International Patent Application No. PCT/KR2016/009274, dated Dec. 8, 2016, 6 pages, publisher The ISA/KR, International Application Division, Korean Intellectual Property Office, Daejeon, Republic of Korea.
The International Searching Authority, "International Search Report," International Patent Application No. PCT/KR2016/001989, dated Jun. 16, 2016, 3 pages, publisher The ISA/KR, International Application Division, Korean Intellectual Property Office, Daejeon, Republic of Korea.
The International Searching Authority, "Written Opinion," International Patent Application No. PCT/KR2016/001989, dated Jun. 16, 2016, 9 pages, publisher The ISA/KR, International Application Division, Korean Intellectual Property Office, Daejeon, Republic of Korea.
European Patent Office, "European Search Report," Application No. 16155258.3, dated Jun. 30, 2016, 7 pages, publisher EPO, Munich, Germany.
European Patent Office, "European Search Report," Application No. 16157635.0, dated Jul. 25, 2016, 10 pages, publisher EPO, Munich, Germany.
European Patent Office, "European Search Report," Application No. 16157728.3, dated Jul. 25, 2016, 7 pages, publisher EPO, Munich, Germany.
Apple Inc., "About Apple Pay in the US—Apple Support," 2015, 6 pages, available at https://support.apple.com/en-us/HT201469.

George Wallner, "Stronger Security and Mobile Payments—Dramatically Faster and Cheaper to Implement," 2014, 8 pages, publisher LoopPay, Inc., Burlington, MA.
"A Practical Approach for Implementation of Public Key Infrastructure for Digital Signatures", Reddy, et al., ISSN 2224-5758 vol. 1,No. 2,2011, 11 pgs.
"About Apple Pay in the US", Apple Support, https://support.apple.com/en-us/HT201469, Oct. 22, 2015, 6 pgs.
"Stronger Security and Mobile Payments—Dramatically Faster and Cheaper to Implement", LoopPay White Paper by George Wallner, 2014, 8 pgs.
"Receiver-deniable Public-Key Encryption", Maged H. Ibrahim, International Journal of Network Security, vol.8,No.2, pp. 159-165, Mar. 2009.
Office Action dated Nov. 14, 2017 in connection with Australian Patent Application No. 2016224183.
Office Action dated Nov. 22, 2017 in connection with European Patent Application No. 16 755 927.7.
Office Action dated Nov. 23, 2017 in connection with European Patent Application No. 16 755 947.5.
Supplementary European Search Report dated Jan. 25, 2018 in connection with European Patent Application No. 16 75 5957.
Supplementary European Search Report dated Nov. 23, 2017 in connection with European Patent Application No. 16 75 5950.
Supplementary European Search Report dated Jan. 25, 2018 in connection with European Patent Application No. 16 75 5948.
Philip Garner et al., "Card-based Macropayment for Mobile Phones", International Conference on Mobile Business, Jun. 26-27, 2006, 7 pages.
"Magnetic stripe card", Wikipedia, Jan. 12, 2018, 10 pages.
Supplementary European Search Report dated Dec. 1, 2017 in connection with European Patent Application No. 16 75 5954.
Australian Government IP Australia, "Examination report No. 2 for stand patent application," Australian Application No. AU2016224183, dated Mar. 23, 2018, 3 pages.
European Patent Office, "Supplementary Partial European Search Report," European Application No. EP16755921.0, dated May 11, 2018, 20 pages.
European Patent Office, "Communication pursuant to Article 94(3) EPC," European Application No. EP16155258.3, dated Apr. 30, 2018, 7 pages.
European Patent Office, "Communication pursuant to Article 94(3) EPC," European Application No. EP16157635.0, dated May 22, 2018, 8 pages.
Extended European Search Report regarding Application No. 16839601.8, dated Jun. 26, 2018, 11 pages.
The State Intellectual Property Office of the People's Republic of China First Office Action regarding Application No. 201610111381.X, dated Jun. 27, 2018, 17 pages.
Extended European Search Report regarding Application No. 16839570.5, dated Jun. 29, 2018, 7 pages.
IP Australia Notice of Acceptance for Patent Application regarding Application No. 2016224183, dated Jul. 4, 2018, 3 pages.
European Patent Office Communication regarding Application No. 16157728.3, dated Sep. 4, 2018, 7 pages.
IP Australia Examination Report No. 1 for Standard Patent Application regarding Application No. 2016216833, dated Sep. 6, 2018, 4 pages.
European Patent Office Communication regarding Application No. 16755957.4, dated Sep. 26, 2018, 8 pages.
European Patent Office Communication regarding Application No. 16157635.0 dated Oct. 19, 2018, 13 pages.
European Patent Office Communication regarding Application No. 16755927.7 dated Oct. 19, 2018, 6 pages.
European Patent Office Communication regarding Application No. 16755948.3 dated Oct. 22, 2018, 9 pages.
Office Action dated Nov. 2, 2018 in connection with U.S. Appl. No. 15/221,030, 33 pages.
Office Action dated Oct. 19, 2018 in connection with U.S. Appl. No. 15/156,871, 62 pages.
N. Asokan et al., "Mobile Trusted Computing", Proceedings of the IEEE, vol. 102, No. 8, Aug. 2014, pp. 1189-1206.

(56) References Cited

OTHER PUBLICATIONS

Tao Feng et al., "Secure Session on Mobile: An Exploration on Combining Biometric, TrustZone, and User Behavior", 2014 6th International Conference on Mobile Computing, Applications and Services (MobiCASE), Nov. 2014, 11 pages.
Hans Lohr et al., "Patterns for Secure Boot and Secure Storage in Computer Systems", 2010 International Conference on Availability, Reliability and Security, Krakow, 2010, pp. 569-573.

* cited by examiner

TRUST-ZONE-BASED END-TO-END SECURITY

CROSS-REFERENCE TO RELATED APPLICATION(S) AND CLAIM OF PRIORITY

This application claims priority under 35 U.S.C. § 119(e) to U.S. Provisional Patent Application No. 62/126,121 filed on Feb. 27, 2015 and U.S. Provisional Patent Application No. 62/209,125 filed on Aug. 24, 2015. The above-identified provisional patent applications are hereby incorporated by reference in their entirety.

TECHNICAL FIELD

This disclosure relates generally to data security. More specifically, this disclosure relates to trust zone based end-to-end security for information exchange.

BACKGROUND

Using consumer electronic device as a means of payment for a payment transaction is popular and convenient for consumers. However, when enrolling credit cards on electronic devices, the sensitive secrete credit card payment information artifacts (e.g., account numbers, tokens, keys, etc.) are exposed to attackers because these artifacts are exchanged between electronic device and the card network token service provider (TSP).

SUMMARY

Embodiments of the present disclosure provide trust-zone-based end-to-end security for information exchange.

In one embodiment, a method for exchanging encrypted information by an electronic device is provided. The method includes generating one or more device certificates and one or more device public private key pairs. The one or more device certificates are signed by a device unique private key that is pre-stored on the electronic device. The method also includes transmitting the one or more device certificates to a server of a TSP. The method further includes receiving one or more TSP certificates from the TSP server. The method includes identifying one or more TSP public keys of the TSP server based on the one or more received TSP certificates. Additionally, the method includes transmitting a message including the information encrypted based on the one or more identified TSP public keys and a signature of the electronic device.

In another embodiment, an electronic device for exchanging encrypted information is provided. The electronic device includes at least one processor configured to generate one or more device certificates and one or more device public private key pairs. The one or more device certificates are signed using a device unique private key that is pre-stored on the electronic device. The electronic device also includes a transceiver configured to transmit the one or more device certificates to a server of a TSP and receive one or more TSP certificates from the TSP server. The at least one processor is further configured to identify one or more TSP public keys of the TSP server based on the one or more received TSP certificates. The at least one transceiver is configured to transmit a message including the information encrypted based on the one or more identified TSP public keys and a signature of the electronic device.

In yet another embodiment, a system for exchanging encrypted information of a TSP is provided. The system includes at least one processor configured to generate one or more TSP certificates and one or more TSP public private key pairs. The one or more TSP certificates are signed using a TSP root certificate authority (CA) private key. The system also includes a communication interface configured to transmit the one or more TSP certificates to an electronic device and receive one or more device certificates from the electronic device. The at least one processor is further configured to verify an authenticity of the one or more device certificates based on a public key for a root CA private key of a manufacturer of the electronic device. The communication interface is configured to receive, from the electronic device, a message including the information encrypted based on one or more TSP public keys of the one or more TSP public private key pairs and a signature of the electronic device.

In other embodiments, a system of and method for operation of a manufacturer of an electronic device for exchanging root CA certificates with a TSP and storing a device unique private key on the electronic device that is signed using a root CA private key of the manufacturer is provided. In yet other embodiments, methods and computer-readable media of a trusted application for secure end to end information exchange are provided.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
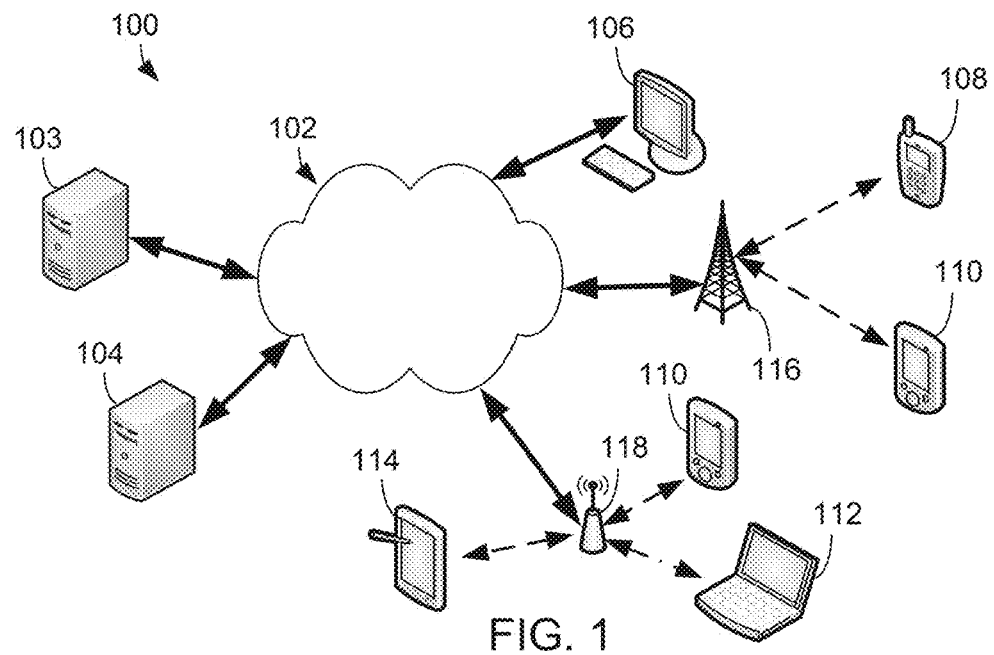
FIG. 1 illustrates an example communication system in which various embodiments of the present disclosure may be implemented.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, or other information between network addresses. The network 102 may include one or more local area networks (LANs); metropolitan area networks (MANs); wide area networks (WANs); all or a portion of a global network, such as the Internet; or any other communication system or systems at one or more locations.

The network 102 facilitates communications between various servers 103 and 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or communication device that interacts with at least one server or other computing device(s) over the network 102. In this example, the client devices 106-114 include electronic devices, such as, for example, a desktop computer 106, a mobile telephones or smartphones 108, a personal digital assistant (PDA) 110, a laptop computer 112, a tablet computer 114, a wearable device, smart watch, etc. However, any other or additional client devices could be used in the communication system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points (APs) 118, such as IEEE 802.11 wireless APs, Bluetooth, and Wifi direct. Note that these are for illustration only and that each client device could communicate directly with the network 102 or indirectly with the network 102 via any suitable intermediate device(s) or network(s).

As described in more detail below, the servers 103 or 104 represent servers associated with a manufacturer of one or more of the client devices, CA servers, payment servers, or TSP servers that participate in enabling trust-zone-based end-to-end security. For example, one or more of the client devices 108-114 include a Trust-Zone Execution Environment (TEE) to enable end-to-end secure exchange of information for credit card enrollment.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
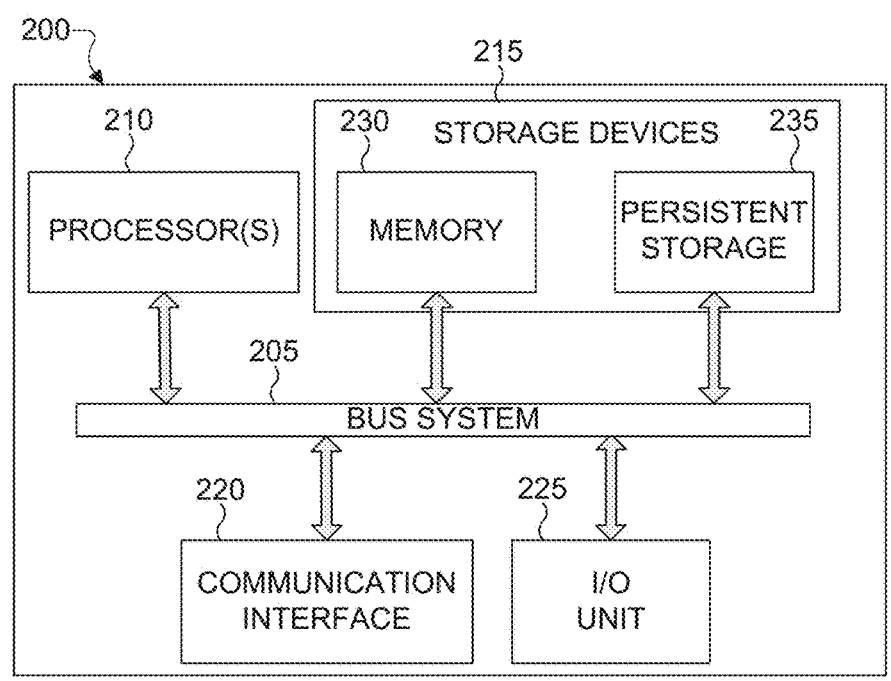
FIG. 2 illustrates an example server according to various embodiments of the present disclosure.
Figure 3:
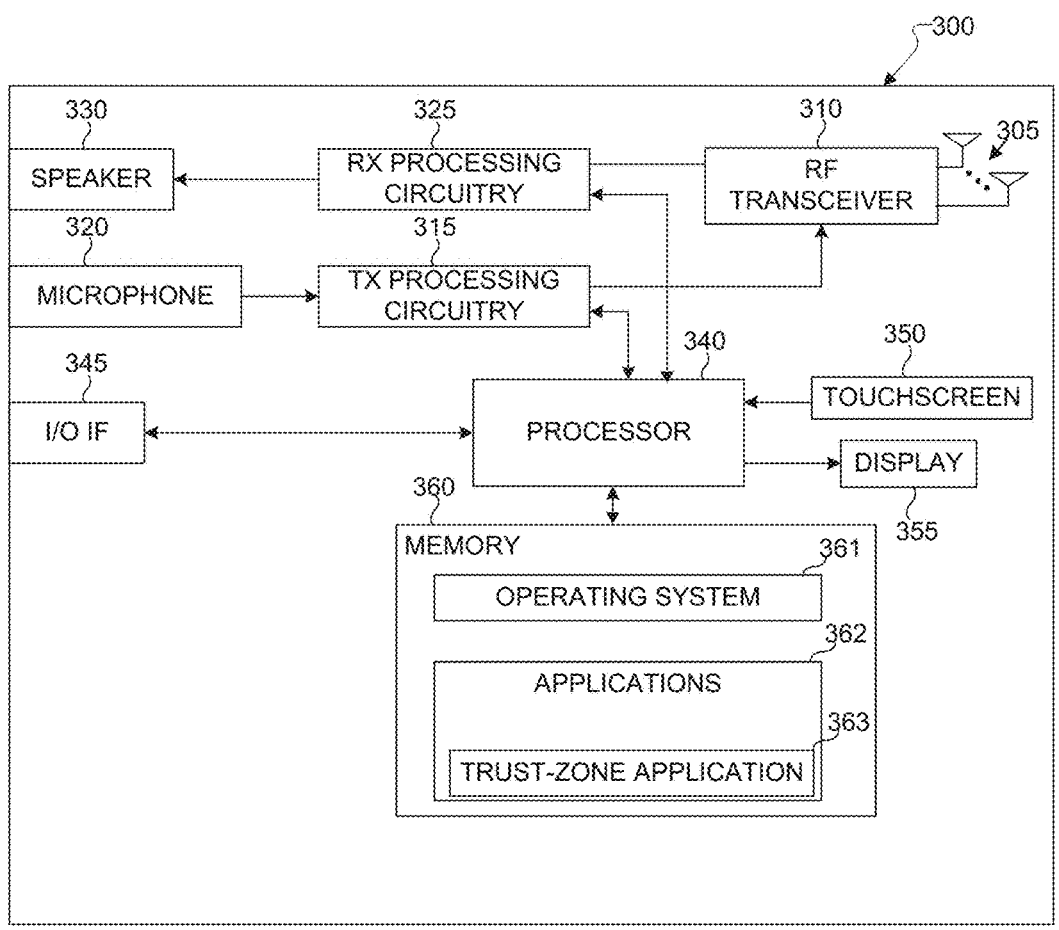
FIG. 3 illustrates an example electronic device according to various embodiments of the present disclosure.

FIGS. 2 and 3 illustrate example electronic devices in a communication system according to various embodiments of the present disclosure. In particular, FIG. 2 illustrates an example server 200, and FIG. 3 illustrates an example electronic device 300. In this illustrative example, the server 200 represents the servers 103 or 104 in FIG. 1, and the electronic device 300 could represent one or more of the client devices 108-114 in FIG. 1.

As shown in FIG. 2, the server 200 includes a bus system 205, which supports communication between at least one processor 210, at least one storage device 215, at least one communication interface 220, and at least one input/output (I/O) unit 225.

The processor 210 executes instructions that may be loaded into a memory 230. The processor 210 may include any suitable number(s) and type(s) of processors or other devices in any suitable arrangement. Example types of processor 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a read-only memory, hard drive, Flash memory, or optical disc.

The communication interface 220 supports communications with other systems or devices. For example, the communication interface 220 could include a network interface card or a wireless transceiver facilitating communications over the network 102. The communication interface 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

As described in more detail below, the server 200 may be a server associated with a manufacturer of one or more of the client devices, CA servers, payment servers, or TSP servers that participate in enabling trust-zone-based end-to-end security.

FIG. 3 illustrates an example electronic device 300 according to various embodiments of the present disclosure. The embodiment of the electronic device 300 illustrated in FIG. 3 is for illustration only, and the client devices 108-114 of FIG. 1 could have the same or similar configuration. However, electronic devices come in a wide variety of configurations, and FIG. 3B does not limit the scope of this disclosure to any particular implementation of an electronic device.

As shown in FIG. 3, the electronic device 300 includes antenna(s) 305, a radio frequency (RF) transceiver 310, TX processing circuitry 315, a microphone 320, and receive (RX) processing circuitry 325. The electronic device 300 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors and execute the OS program 361 stored in the memory 360 in order to control the overall operation of the electronic device 300. In some embodiments, the processor 340 includes at least one microprocessor or microcontroller.

The processor 340 is also capable of executing other processes and programs resident in the memory 360, such as operations that receive, store, and timely instruct the display of videos for screen burn-in prevention and reduction management. The processor 340 can move data into or out of the memory 360 as required by an executing process. In some embodiments, the processor 340 is configured to execute a plurality of applications 362, such as trust-zone application 363 for managing certificates and encryption keys enable trust-zone-based end-to-end security for exchanging payment related information with one or more servers.

The processor 340 can operate the plurality of applications 362 based on the OS program 361. The processor 340 is also coupled to the I/O interface 345, which provides electronic device 300 with the ability to connect to other devices such as laptop computers and handheld computers. The I/O interface 345 is the communication path between these accessories and the processor 340. For example, the I/O interface 345 may include a near field communication (NFC) module for near field communication with, for example, a payment device to process a payment transaction.

The processor 340 is also coupled to the touchscreen 350 and the display 355. The operator of the electronic device 300 can use the touchscreen 350 to enter data into the electronic device 300. The display 355 may be a may be a liquid crystal display, a light-emitting diode (LED) display, an optical LED (OLED), an active matrix OLED (AMO-LED), or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIGS. 2 and 3 illustrate examples of devices in a communication system, various changes may be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the electronic device 300 configured as a mobile telephone or smartphone, electronic devices could be configured to operate as other types of mobile or stationary devices. In addition, as with computing and communication networks, client devices and servers can come in a wide variety of configurations, and FIGS. 2 and 3 do not limit this disclosure to any particular electronic devices.

Various embodiments of the present disclosure provide methods and systems ensure the payment artifacts can only be decrypted in a TEE of the electronic device 300 or by the TSP, creating end-to-end security, irrespective of any intermediate platforms the information has to traverse, such as the regular operating system of the electronic device, the Internet, and any servers that handle messages for TSP. In order to protect the secrecy of credit card payment artifacts, such as account numbers, tokens, and keys, one or more precautions may be taken. For example, in some embodiments, an encryption method is implemented to ensure the payment artifacts can only be decrypted in the TEE of the electronic device 300 or by the card network TSP, which creates end-to-end security.

Figure 4:
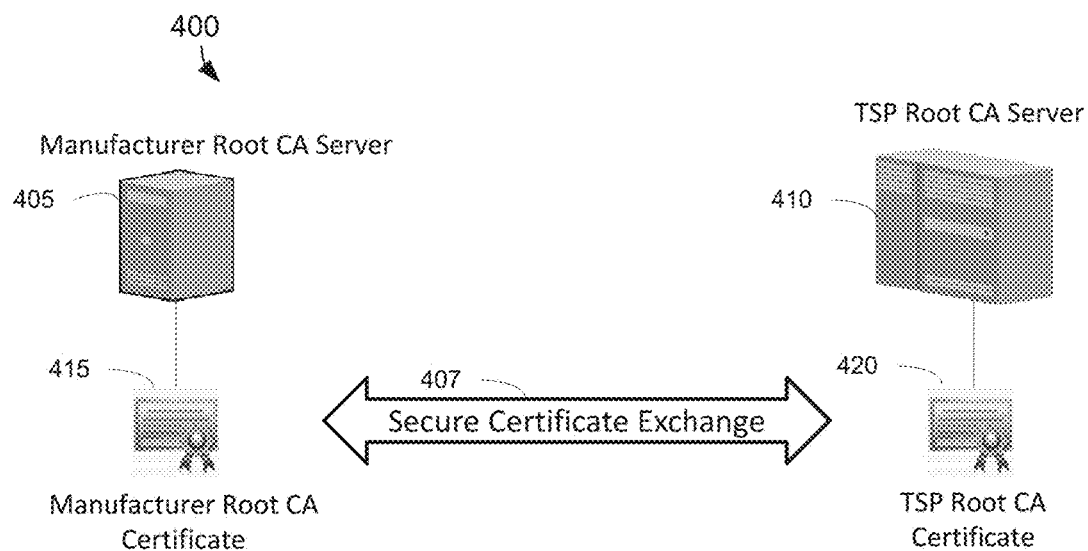
FIG. 4 illustrates a flow diagram for a secure exchange of root CA certificates in accordance with various embodiments of the present disclosure.

FIG. 4 illustrates a flow diagram 400 for a secure exchange of root CA certificates in accordance with various embodiments of the present disclosure. The embodiment of the flow diagram 400 shown in FIG. 4 is for illustration only. Other embodiments of the flow diagram 400 could be used without departing from the scope of this disclosure.

In this embodiment, a manufacturer root CA server 405 of a manufacturer of the electronic device 300 to be used in the trust-zone-based end-to-end security performs a secure certificate exchange (407) with a TSP root CA server 410 of a TSP to establish the root of trust between manufacturer and the TSP. For example, the manufacturer root CA server 400 sends the manufacturer root CA certificate 415 to the TSP root CA server 410 and the TSP root CA server 410 sends the TSP root CA certificate 420 to the manufacturer root CA server 400. The respective servers 400 and 410 may then store the respective certificates 415 and 420 for later use in enabling trust-zone-based end-to-end security for the electronic device 300.

In some embodiments, the secure certificate exchange (407) may be performed offline to ensure no interception of the certificates 415 and 420. For example, the exchange may occur via a direct connection or over an encrypted communication channel.

Figure 5:
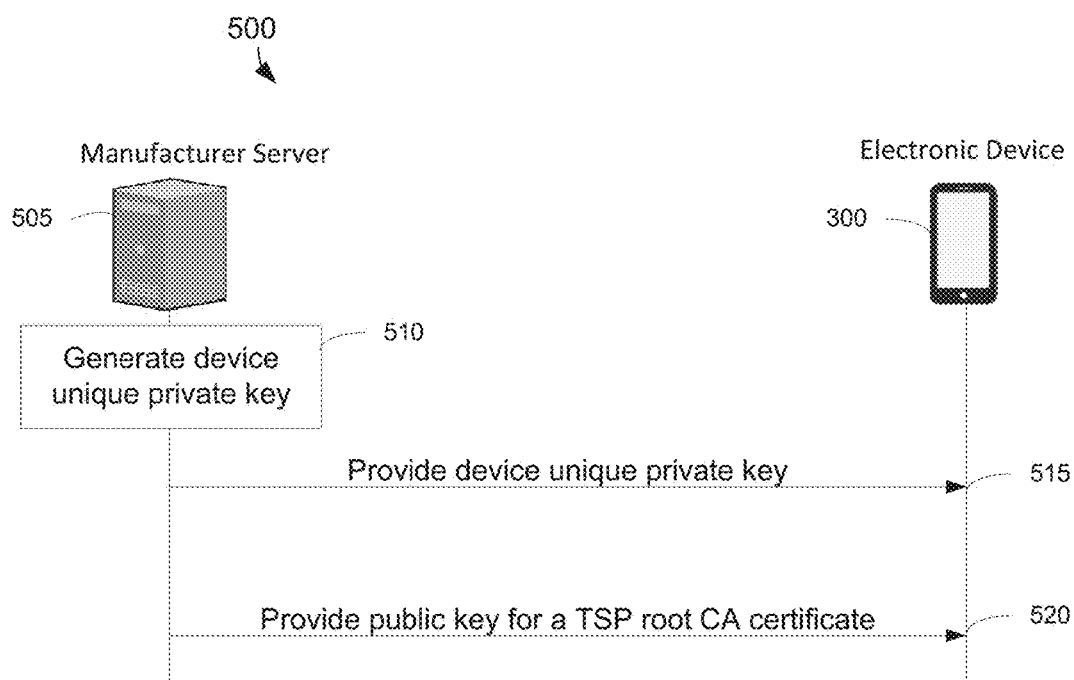
FIG. 5 illustrates a flow diagram for storing information to enable trust-zone-based end-to-end security in an electronic device during device manufacturing in accordance with various embodiments of the present disclosure.

FIG. 5 illustrates a flow diagram 500 for storing information to enable trust-zone-based end-to-end security in the electronic device 300 during device manufacturing in accordance with various embodiments of the present disclosure. The embodiment of the flow diagram 500 shown in FIG. 5 is for illustration only. Other embodiments of the flow diagram 500 could be used without departing from the scope of this disclosure.

In this embodiment, the manufacturing server 505 generates a device unique private key for the electronic device 300 (510) that is unique to the device 300 so that each device made by the manufacturer can be uniquely identified. For example, the manufacturing server 505 is a server used in the manufacturing process for example to program data or software for the electronic device 300 prior to sale of the electronic device 300. In this example, the certificate for the device unique private key is signed with the manufacture root CA private key (e.g., for the manufacturer root CA certificate 415). For example, the manufacturer root CA server 400 may sign the certificate for the device unique private key so that later the TSP may verify and authorize the electronic device to enable trust-zone-based end-to-end security. In some embodiments, the manufacturer root CA server 400 and the manufacturing server 505 may be the same.

The manufacturing server 505 provides the generated device unique private key to the electronic device 300 (515). For example, the manufacturing server 505 stores, loads, or embeds the generated device unique private key for use by a trust-zone application 363 on the electronic device 300. The manufacturing server 505 also provides the TSP Root CA public key to the electronic device 300 (520). For example, manufacturing server 505 stores, loads, or embeds the use by the trust-zone application 363 so that trust-zone application 363 can later verify a certificate of the TSP.

Figure 6:
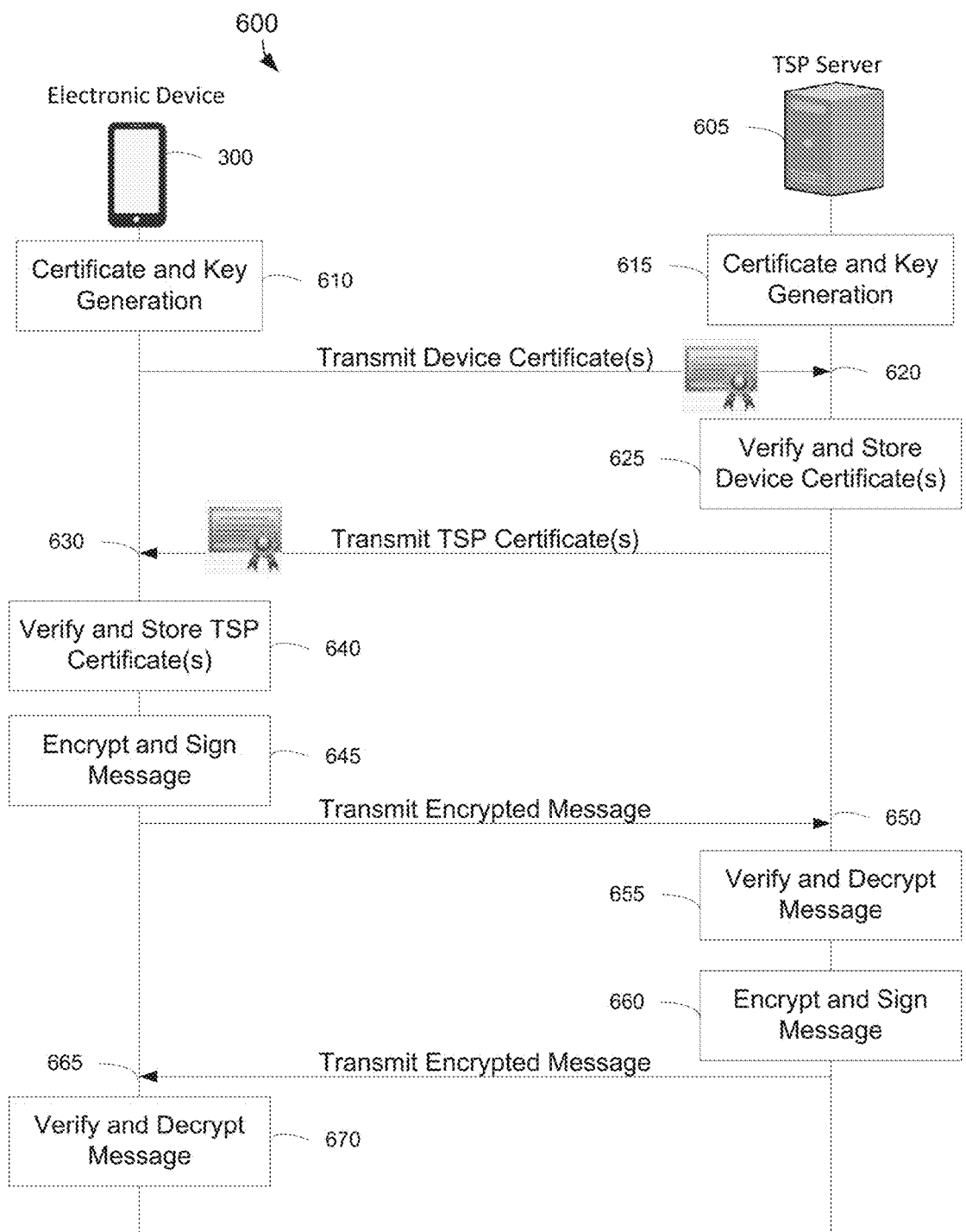
FIG. 6 illustrates a flow diagram for enabling trust-zone-based end-to-end security in accordance with various embodiments of the present disclosure.

FIG. 6 illustrates a flow diagram 600 for enabling trust-zone-based end-to-end security in accordance with various embodiments of the present disclosure. The embodiment of the flow diagram 600 shown in FIG. 6 is for illustration only. Other embodiments of the flow diagram 600 could be used without departing from the scope of this disclosure.

In this embodiment, the electronic device 300 device generates a unique signing certificate (e.g., dev_sign_cert) and a public private key pair and a unique encryption certificate (e.g., dev_enc_cert) and a public private key pair (610). These certificates are signed by the device unique private key that was stored on the electronic device 300 during manufacturing as discussed above. The certificate of this private key is signed by the manufacturer root CA private key. The public key for the manufacturer root CA private key is shared with each card network offline, through a secure certificate exchange as discussed above.

Similarly, the TSP server 605 also generates a signing certificate (e.g., server_sign_cert) and a public private key pair, and an encryption certificate (e.g., server_enc_cert) and a public private key pair (615). For example, the certificates generated may be signed by the TSP root CA server 410 and the root CA public key that signed these certificates is shared with the manufacturer root CA server 405 through the secure certificate exchange. During development of the specific trusted application of the card network, the TSP root CA public keys are embedded in the TSP server 610. In some embodiments, the TSP root CA server 410 and the TSP server 605 may be the same. The certificate generation may be dynamic and performed as needed. This dynamic certificate generation can prevent a third party from compromising all communications and devices if a key is ever intercepted.

Thereafter, the electronic device 300 and the TSP server 605 exchange, verify, and cache each other encryption and signature public keys for encryption and signature verification. Prior to enrolling credit cards, trust-zone application 363 on the electronic device 300 transmits the one or more (e.g., two) public certificates that were ultimately signed by the manufacturer root CA private key to the TSP server (620). The TSP server 605 verifies that the device certificates are valid and the signature(s) belong to the Manufacturer root CA based on the earlier certificate exchange and stores the device certificates for later use. Similarly, the TSP server 605 transmits the one or more (e.g., two) certificates that are signed by the TSP server's 605 own root CA to the trust-zone application 363 in the TEE on the electronic device 300 (630). The trust-zone application 363 in the electronic device 300 verifies the TSP certificates and the signature and stores the public keys from the certificates (640).

Having exchanged and verified certificates, the electronic device 300 and the TSP server 605 can now send messages to each other using trust-zone-based end-to-end security. For example, the electronic device 300 encrypts a message payload by generating a random session key to encrypt payload, then uses the encryption public key of the TSP server 605 to encrypt session key so that only the TSP server 605 decrypt the session key and payload and signs the message (645) using the signature private key of the electronic device 300 to sign the whole message so that TSP server 605 can verify the authenticity of this message. The electronic device 300 transmits the encrypted message to the TSP server 605 (650). The TSP server 605 verifies the message came from the electronic device 300 based on the signature and decrypts the message by decrypting the session key using the private encryption key of the TSP server 605 and then decrypting the message payload using the decrypted session key (650).

Similarly, to exchange secure data between the TEE on the electronic device 300 and the TSP server 605, the TSP server 605 generates a random session key to encrypt the payload, encrypts the session key using the encryption public key of the electronic device 300, and signs the message using the TSP server's 605 signing certificate private key (660). The TSP server 605 transmits the encrypted message to the electronic device 300 (665). The electronic device 300 verifies the message came from the TSP server 605 based on the signature and decrypts the message by decrypting the session key using the private encryption key of the electronic device 300 and then decrypting the message payload using the decrypted session key (650).

In these examples, the payload of the messages includes payment information (e.g., credit card numbers, account numbers, tokens, keys, card identifiers, a card verification value (CCV), expiration dates, etc.) However, in other embodiments any type of secure or sensitive information may be transmitted in the payload of the messages securely transmitted using-zone-based end-to-end security.

In this way, the trust-zone application 363 in the TEE of the electronic device 300 and the TSP server 605 can verify the signature using other end's signing certificate public key and make sure the messages are from card network TSP and/or device trust-zone application 363 in the TEE. No other intermediaries can access the clear text form of what is exchanged between TSP and trust-zone application 363 in TEE, nor can other intermediaries access the keys that are needed to decrypt the payload, thus providing trust-zone-based end-to-end security.

Although FIGS. 4-6 illustrate examples of flow diagrams for secure exchange of root CA certificates, storing information for enabling trust-zone-based end-to-end security, and enabling trust-zone-based end-to-end security, respectively, various changes could be made to FIGS. 4-6. For example, while shown as a series of steps, various steps in each figure could overlap, occur in parallel, occur in a different order, occur multiple times, or not be performed in one or more embodiments.

Figure 7A:
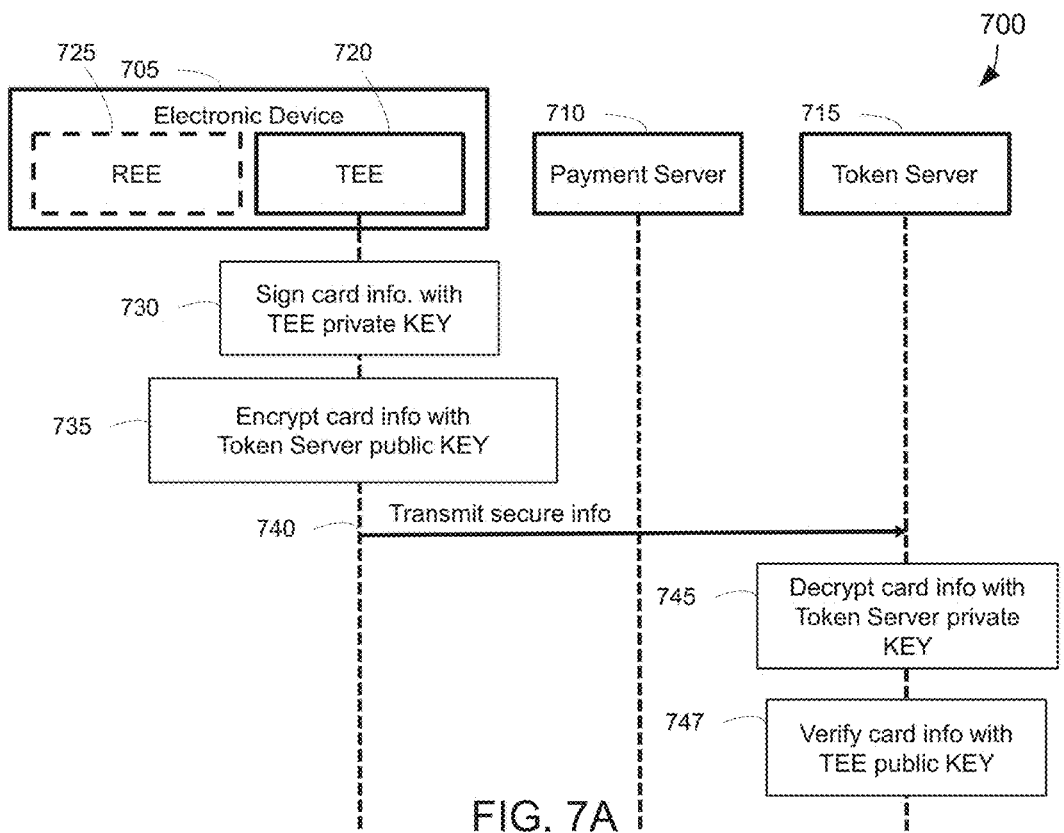
FIGS. 7A and 7B illustrate flow diagrams of an encryption operation of a payment system according to various embodiments of the present disclosure.
Figure 7B:
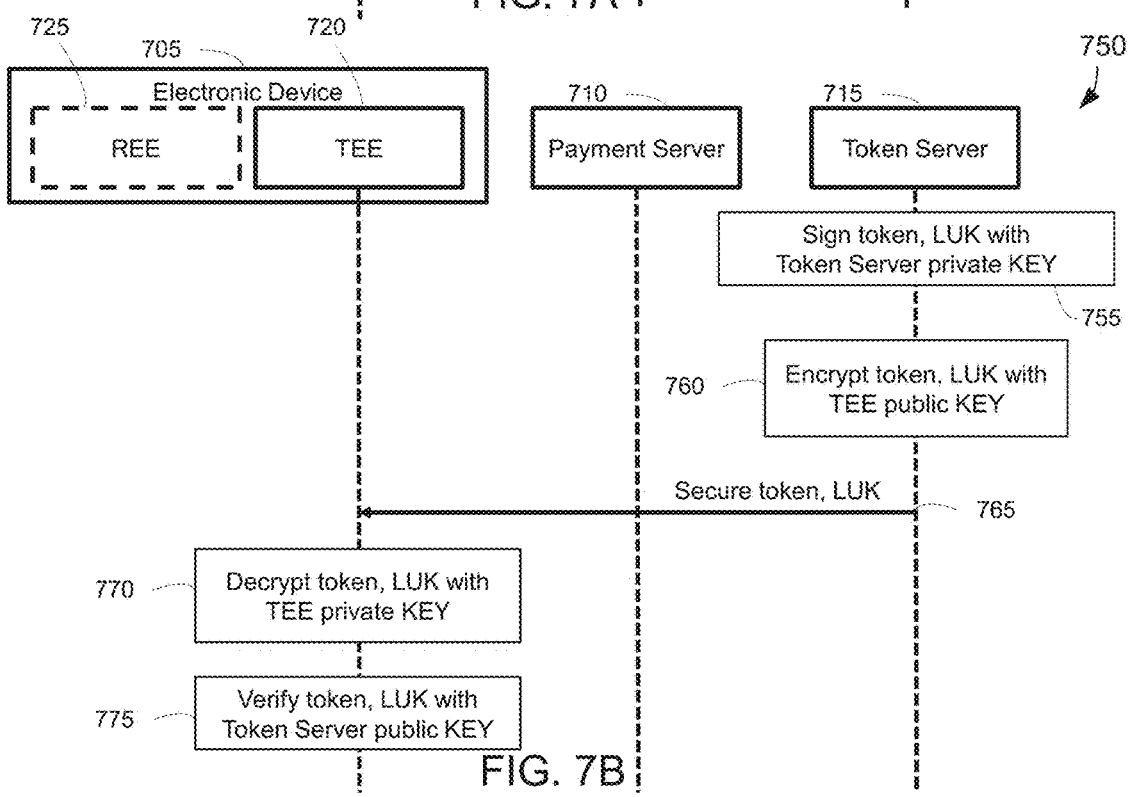

FIGS. 7A and 7B illustrate flow diagrams 700 and 750 of an encryption operation of a payment system according to various embodiments of the present disclosure. FIG. 7A illustrates a signal flow 700 of an end-to-end encryption operation according to various embodiments. According to an embodiment, the payment system may include an electronic device 705, a payment server 710, or a token server 715. The electronic device 705 may include a TEE 720 or a rich execution environment (REE) 725 having a lower security level than the TEE.

According to various embodiments, the end-to-end encryption operation may be performed in order to protect information used in the payment system, for example, Primary Account Number (PAN), CVV, card valid term, or Limited Use Key (LUK). According to one embodiment, each of the TEE 720, the payment server 710, and the token server 715 may perform an encryption operation in order to protect exchanged information (e.g., data). Further, each of the TEE 720, the payment server 710, and the token server 715 may generate an encryption communication channel therebetween and may exchange information using the encryption communication channel.

According to various embodiments, the token server 715 may use public key encryption. For example, the token server 715 may generate a public key and a private key, using a key (e.g., on-boarding key) included in the token server 715. For example, the public key of the token server 715 may be called a token server public key, and the private key of the token server 715 may be called a token server private key.

According to various embodiments, the electronic device 705 may generate a public key and a private key, using a key (e.g., Device Root Key (DRK)) included in the electronic device 705. For example, the public key of the electronic device 705 may be called a TEE public key, and the private key of the electronic device 705 may be called a token server private key. The token server public key and the TEE public key may be shared between the TEE 720 and the token server 715.

According to various embodiments, the electronic device 705 (e.g., TEE 720) may transfer the TEE public key to the token server 715. Further, the token server 715 may transfer the token server public key to the electronic device 705. For example, the token server public key and the TEE public key may be shared between the TEE 720 and the token server 715 when a communication channel (session) is generated therebetween. Further, the token server public key and the TEE public key may be shared between the TEE 720 and the token server 715, for example, based on a user input or an external input. Further, the token server public key and the TEE public key may be shared between the TEE 720 and the token server 715, for example, when a predetermined condition (e.g., an encryption function request) is satisfied.

According to various embodiments, when the public key is shared, an authentication certificate included in each of the electronic device 705 (e.g., TEE 720) and the token server 715 may be used for signing (signature) of the public key. The authentication certificate may be used, for example, in order to perform non-repudiation of the information shared by the TEE 720 and the token server 715. Further, the authentication certificate may be issued (generated) through, for example, a Certificate Authority (CA). The signature may include, for example, a digital signature.

According to various embodiments, the payment system may perform an end-to-end encryption operation in order to protect the PAN. According to various embodiments, the electronic device 720 (e.g., TEE 720) may use the TEE private key for signing (signature) of the card information used (730) in the payment function based on the token server public key. The card information may include, for example, PAN, CVV, or card valid term.

According to various embodiments, the electronic device 705 (e.g., TEE 720) may use the TEE private key in encrypting the signed card information used in the payment function (735). According to various embodiments, the electronic device 705 (e.g., TEE 720) may transfer, to the token server 715, the PAN, CVV, or card valid term, which have been subjected to the signature and encryption (740). According to various embodiments, the card information having been subjected to the signature and encryption may be transferred either to the token server 715 through the payment server 710 or directly to the token server 715 without passing through the payment server 715.

According to various embodiments, the token server 715 may signature-decrypt using the token server private key, the card information which has been received from the electronic device and has been subjected to the signature and encryption (745). According to various embodiments, when the card information has been decrypted using the token server private key, the token server 715 may identify the signed card information. According to various embodiments, the token server 715 may check whether the signature-authentication of the signed card information is valid, using the TEE public key (747). According to various embodiments, the token server 715 may use the decrypted and signature-identified card information or store it in the token server 715.

FIG. 7B illustrates a signal flow 750 of an end-to-end encryption operation in a payment system according to various embodiments. According to an embodiment, the payment system may include an electronic device 705, a payment server 710, or a token server 715. The electronic device may include an REE 725 and/or a TEE 720.

According to various embodiments, the end-to-end encryption operation may be performed in order to protect information used in the payment system, for example, PAN or LUK. According to one embodiment, each of the TEE 720, the payment server 710, and the token server 715 may perform an encryption operation in order to protect exchanged information (e.g., data). Further, each of the TEE 720, the payment server 710, and the token server 715 may generate an encryption communication channel therebetween and may exchange information using the encryption communication channel.

According to various embodiments, the electronic device 705 (e.g., TEE 720) may transfer the TEE public key to the token server. Further, the token server 715 may transfer the token server public key to the electronic device 705. For example, the token server public key and the TEE public key may be shared between the TEE 720 and the token server 715 when a communication channel (session) is generated therebetween. Further, the token server public key and the TEE public key may be shared between the TEE 720 and the token server 715, for example, based on a user input or an external input. Further, the token server public key and the TEE public key may be shared between the TEE 720 and the token server 715, for example, when a predetermined condition (e.g., an encryption function request) is satisfied.

According to various embodiments, when the public key is shared, an authentication certificate included in each of the electronic device 705 (e.g., TEE 720) and the token server 715 may be used for signing (signature) of the public key. The authentication certificate may be used, for example, in order to perform non-repudiation of the information shared by the TEE 720 and the token server 715. Further, the authentication certificate may be issued (generated) through, for example, a Certificate Authority (CA). The signature may include, for example, a digital signature.

According to various embodiments, the payment system may perform an end-to-end encryption operation in order to protect the LUK. According to various embodiments, the token server 715 may use the token server private key for signing (signature) of the token and key (e.g., LUK) information used in the payment function (755). The key information may include, for example, an LUK, and may be functionally connected to the token ID to be used for the payment function. Further, one or more pieces of key information may be generated based on, for example, the token ID or the PAN.

According to various embodiments, the token server 715 may use the TEE public key to encrypt the token and LUK (760), which have been signed based on the token server private key. According to various embodiments, the token server may transfer the token and LUK, which have been subjected to the signature and encryption, to the electronic device 705 (e.g., TEE 720) (765).

According to various embodiments, the LUK having been subjected to the signature and encryption may be transferred either to the electronic device through the payment server 710 or directly to the electronic device 705 without passing through the payment server 710. According to various embodiments, the electronic device 705 may decrypt, using the TEE 720 private key, the token and LUK which have been received from the token server 715 and has been subjected to the signature and encryption (770).

According to various embodiments, the electronic device 705 (e.g., TEE 720) may identify the singed token and LUK having been decrypted using the TEE private key. According to various embodiments, the electronic device 705 may verify the signed token and LUK, using the token server public key (775). According to various embodiments, the electronic device 705 (e.g., TEE 720) may use the signature-authenticated token or LUK or store them in the electronic device 705 (e.g., TEE 720). According to one embodiment, the token and LUK may be encrypted and stored in the electronic device 705.

Although FIGS. 7A and 7B illustrate examples of flow diagrams of an encryption operation of a payment system according to various embodiments various changes could be made to FIGS. 7A and 7B. For example, while shown as a series of steps, various steps in each figure could overlap, occur in parallel, occur in a different order, occur multiple times, or not be performed in one or more embodiments.

Figure 8:
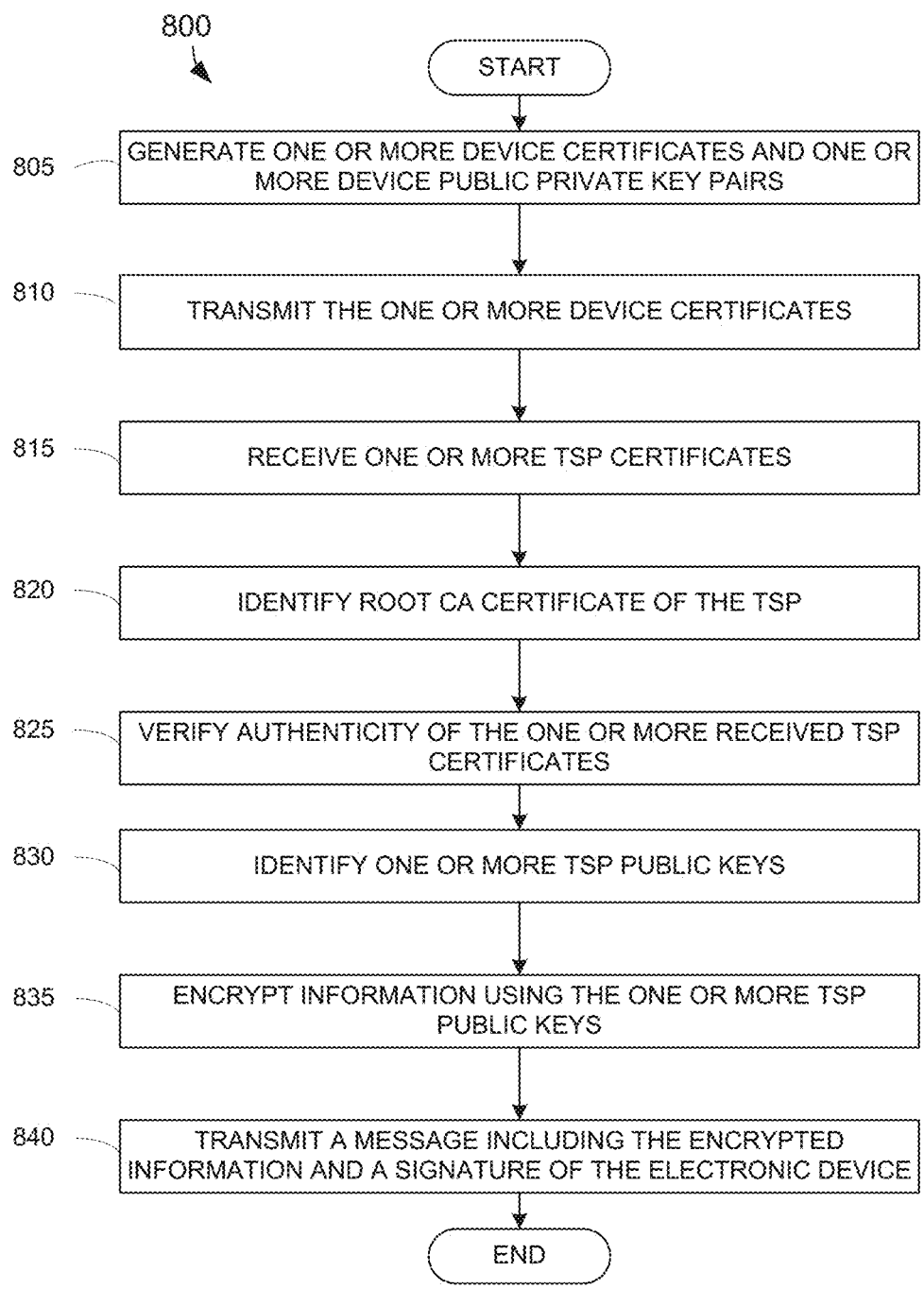
FIG. 8 illustrates a process for exchanging encrypted information by an electronic device according to illustrative embodiments of this disclosure.

FIG. 8 illustrates a process 800 for exchanging encrypted information by an electronic device in accordance with various embodiments of the present disclosure. For example, the process depicted in FIG. 8 may be performed by the electronic device 300. The process may also be implemented by any of the client devices 108-114 in FIG. 1. The embodiment of the process 800 shown in FIG. 8 is for illustration only. Other embodiments of the process 800 could be used without departing from the scope of this disclosure.

The process begins with the electronic device generating one or more device certificates and one or more device public private key pairs (step 805). For example, in step 805, the one or more device certificates may be signed using a device unique private key that is pre-stored on the electronic device. The certificate of the device unique private key may be signed using a root CA private key of a manufacturer of the electronic device where the device unique private key is stored on the electronic device by the manufacturer for access by a trust-zone application 363 of the electronic device. Also, the one or more device certificates may include an encryption certificate and a signing certificate, and the one or more device public private key pairs may include a unique signing public private key pair.

The electronic device transmits the one or more device certificates (step 810). For example, in step 810, the electronic device may transmit the encryption and signing certificates to a server of a TSP. The electronic device receives one or more TSP certificates (step 815). For example, in step 815, the electronic device may receive encryption and signing certificates from the TSP server.

The electronic device identifies a root CA certificate of the TSP (step 820). For example, in step 820, a public key of a root CA certificate of the TSP electronic device may be pre-stored on the electronic device for access by a trusted application of the electronic device. The electronic device verifies an authenticity of the one or more received TSP certificates (step 825). For example, in step 825, the electronic device may verifies the authenticity of the one or more received TSP certificates based on the pre-stored TSP root CA certificate public using the trusted application.

The electronic device identifies one or more TSP public keys (step 830). For example, in step 830, the electronic device may store public keys of the encryption and signing certificates of the TSP in response to verifying the authenticity of the one or more received TSP certificates.

The electronic device encrypts information using the one or more TSP public keys (step 835). For example, in step 835, the electronic device may encrypt the information in the message using a unique session key and encrypt the unique session key using a TSP public encryption key that is included in the one or more identified TSP public keys. The signature of the electronic device may be based on a unique signing private key of the unique signing public private key pair. The encrypted information in the message may include information for registering payment information with the TSP and the payment information associated with the electronic device, for example, for mobile device payments.

The electronic device transmits a message including the encrypted information and a signature of the electronic device (step 840). For example, in step 840, the electronic device may transmit the message to the TSP server for verification and decryption by the TSP server.

Figure 9:
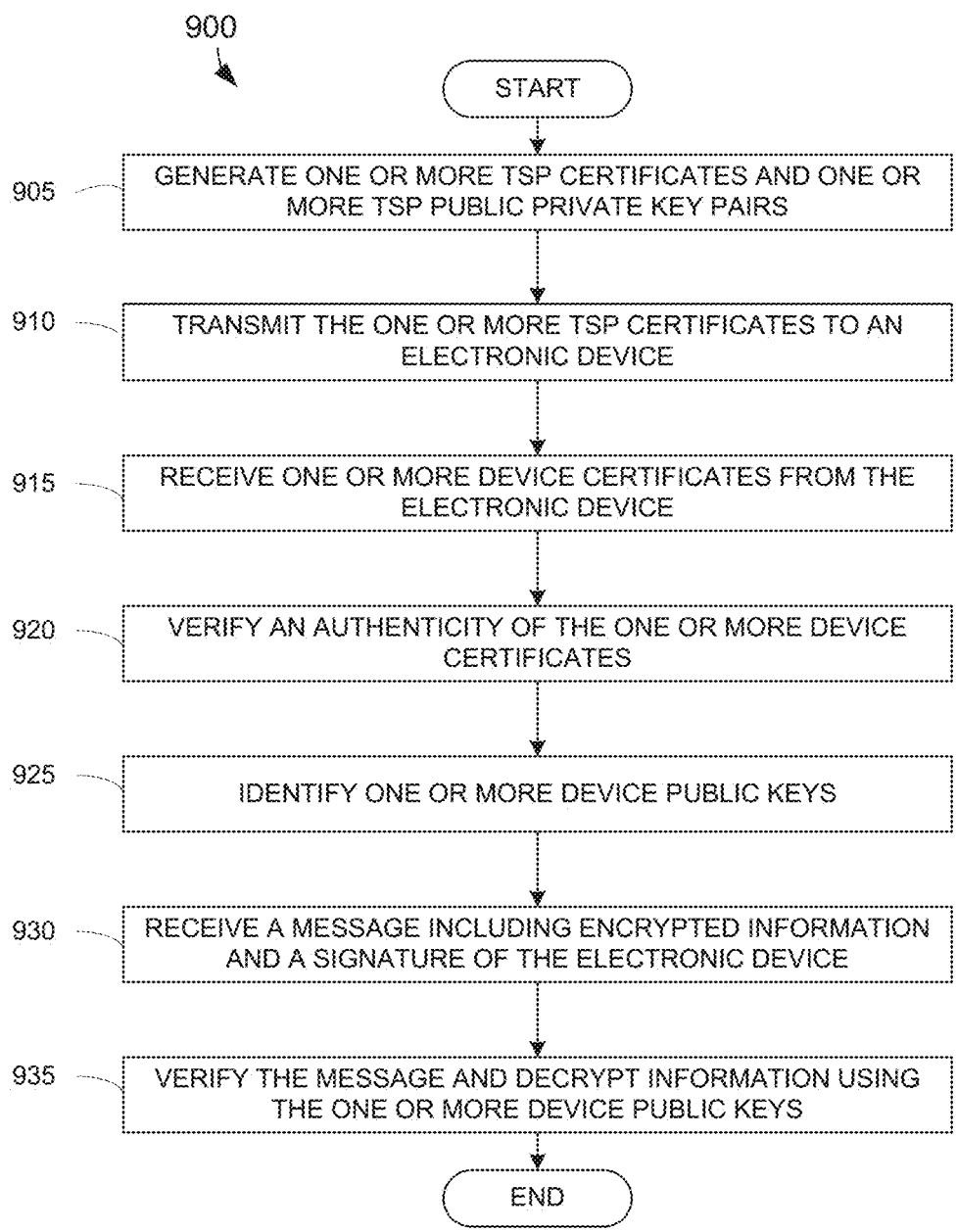
FIG. 9 illustrates processes for exchanging encrypted information by a system of a TSP according to illustrative embodiments of this disclosure.

FIG. 9 illustrates a process 900 for exchanging encrypted information by a system of a TSP in accordance with various embodiments of the present disclosure. For example, the process depicted in FIG. 9 may be performed by the server 200 or the servers 103 or 104 in FIG. 1. The embodiment of the process 900 shown in FIG. 9 is for illustration only. Other embodiments of the process 900 could be used without departing from the scope of this disclosure.

The process begins with the system generating one or more TSP certificates and one or more TSP public private key pairs (step 905). For example, in step 905, the one or more TSP certificates may be signed using a TSP root CA private key for the electronic device to verify based on the TSP root CA public key. The one or more TSP certificates may include an encryption certificate and a signing certificate, and the one or more TSP public private key pairs may include a unique signing public private key pair.

The system transmits the one or more TSP certificates to an electronic device (step 910). For example, in step 910, the system may transmits the one or more TSP certificates to the electronic device for verification of the TSP identity and identification of the TSP public keys for future message transmission. The system receives one or more device certificates from the electronic device (step 915).

The system verifies an authenticity of the one or more device certificates (step 920). For example, in step 920, the system may verify the authenticity of the one or more device certificates based on a public key for a root CA private key of a manufacturer of the electronic device. The system may receive a root CA certificate of the manufacturer of the electronic device during a secure certificate exchange with a server of the manufacturer and identify the public key for the root CA private key of the manufacturer based on the received root CA certificate of the manufacturer. Also as part of this prior exchange with the server of the manufacturer, the system may provide a root certificate authority (CA) certificate of the TSP to the server of the manufacturer during the secure certificate exchange for storage on the electronic device and verification of the TSP. The system identifies one or more device public keys (step 925). For example, in step 925, the system may identify one or more device public keys from the one or more received device certificates in response to verifying the authenticity of the one or more received device certificates.

The system receives a message including encrypted information and a signature of the electronic device (step 930). For example, in step 930, the information may be encrypted based on one or more TSP public keys of the one or more TSP public private key pairs. In particular, the information in the message may be encrypted using a unique session key and the unique session key is encrypted using a TSP public encryption key that is included in the one or more TSP public keys. In some embodiments, the encrypted information in the message may include information for registering payment information with the TSP and the payment information associated with the electronic device, for example, for mobile device payments.

The system verifies the signature and decrypts information using the one or more device public keys (step 935). For example, in step 935, the system may verify that the message was signed by the electronic device may be based on the stored public key of the electronic device and decrypt the information using the private key of the TSP.

Although FIGS. 8 and 9 illustrate examples of processes for exchanging encrypted information various changes could be made to FIGS. 8 and 9. For example, while shown as a series of steps, various steps in each figure could overlap, occur in parallel, occur in a different order, occur multiple times, or not be performed in one or more embodiments.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for exchanging encrypted information by an electronic device, the method comprising:
   generating, by the device, a device signing certificate and a device signing public private key pair, and a device encryption certificate and a device encryption public private key pair, each of the device signing and encryption certificates signed using a device unique private key that is pre-stored on the electronic device;
   transmitting, by the device, the device signing and device encryption certificates to a token service provider (TSP) server;
   receiving, by the device, a TSP signing certificate and a TSP encryption certificate from the TSP server;
   identifying, by the device a TSP signing public key and a TSP encryption public key of the TSP server based on the received TSP signing and the received TSP encryption certificates; and
   transmitting a message including (i) information encrypted based on the TSP encryption public key and (ii) a signature of the electronic device based on the device signing private key,
   wherein the device unique private key is stored on the electronic device by a manufacturer of the electronic device for access by a trusted application of the electronic device and wherein the information includes information for registering payment information with the TSP, the payment information associated with the electronic device.

2. The method of claim 1, wherein:
a certificate of the device unique private key is signed using a root certificate authority (CA) private key of the manufacturer of the electronic device.

3. The method of claim 2, wherein a public key for a root CA private key of the manufacturer of the electronic device is provided to the TSP by the manufacturer of the electronic device prior to the generating of the one or more device certificates and the one or more device public private key pairs.

4. The method of claim 1, wherein identifying the TSP signing and TSP encryption public keys of the TSP server based on the received TSP signing and TSP encryption certificates comprises:
identifying a root certificate authority (CA) certificate of the TSP that is pre-stored on the electronic device for access by a trusted application of the electronic device;
verifying authenticity of the one or more received TSP signing and TSP encryption certificates based on the TSP root CA certificate using the trusted application; and
identifying the TSP signing and TSP encryption public keys in response to verifying the authenticity of the received TSP signing and TSP encryption certificates.

5. The method of claim 1, wherein the information in the message is encrypted using a unique session key and the unique session key is encrypted using the TSP encryption key of a TSP encryption public private key pair.

6. An electronic device for exchanging encrypted information, the electronic device comprising:
at least one hardware processor configured to generate a device signing certificate and a device signing public private key pair, and to generate a device encryption certificate and a device encryption public private key pair, the device signing and encryption certificates signed using a device unique private key that is pre-stored on the electronic device; and
a transceiver configured to transmit the device signing and encryption certificates to a token service provider (TSP) server and to receive a TSP signing certificate and TSP encryption certificate from the TSP server,
wherein the at least one hardware processor is further configured to identify a TSP signing public key and a TSP encryption public key of the TSP server based on the received TSP signing and encryption certificates, and
wherein the transceiver is configured to transmit a message including (i) information encrypted based on the TSP encryption public key and (ii) a signature of the electronic device based on the device signing private key,
wherein the device unique private key is stored on the electronic device by a manufacturer of the electronic device for access by a trusted application of the electronic device and wherein the information includes information for registering payment information with the TSP, the payment information associated with the electronic device.

7. The electronic device of claim 6, wherein:
a certificate of the device unique private key is signed using a root certificate authority (CA) private key of the manufacturer of the electronic device.

8. The electronic device of claim 7, wherein a public key for a root CA private key of the manufacturer of the electronic device is provided to the TSP by the manufacturer of the electronic device prior to generating of the one or more device certificates and the one or more device public private key pairs.

9. The electronic device of claim 6, wherein to identify the TSP signing and TSP encryption public keys of the TSP server based on the received TSP signing and TSP encryption certificates, the at least one hardware processor is configured to:
identify a root certificate authority (CA) certificate of the TSP that is pre-stored on the electronic device for access by a trusted application of the electronic device;
verify authenticity of the received TSP signing and TSP encryption certificates based on the TSP root CA certificate using the trusted application; and
identify the TSP signing and TSP encryption public keys in response to verifying the authenticity of the received TSP signing and TSP encryption certificates.

10. The electronic device of claim 6, wherein the information in the message is encrypted using a unique session key and the unique session key is encrypted using the TSP encryption public key of a TSP encryption public private key pair.

11. A system for exchanging encrypted information of a token service provider (TSP), the system comprising:
a TSP server comprising:
at least one hardware processor configured to generate a TSP signing certificate and a TSP signing public private key pair, and a TSP encryption certificate and a TSP encryption public private key pair, the TSP signing and TSP encryption certificates signed using a TSP root certificate authority (CA) private key; and
a transceiver configured to transmit the TSP signing and TSP encryption certificates to an electronic device and to receive a device signing certificate and a device encryption certificate from the electronic device,
wherein the at least one hardware processor is further configured to verify an authenticity of the device signing and device encryption certificates based on a public key for a root CA private key of a manufacturer of the electronic device, and
wherein the transceiver is configured to receive, from the electronic device, a message including (i) information encrypted based on the TSP encryption public key of the TSP encryption public private key pair and (ii) a signature of the electronic device,
wherein a device unique private key is stored on the electronic device by the manufacturer for access by a trusted application of the electronic device and wherein the information includes information for registering payment information with the TSP, the payment information associated with the electronic device.

12. The system of claim 11, wherein:
the transceiver is configured to receive a root CA certificate of the manufacturer of the electronic device during a secure certificate exchange with a server of the manufacturer, and
the at least one hardware processor is further configured to identify the public key for the root CA private key of the manufacturer based on the received root CA certificate of the manufacturer.

13. The system of claim 12, wherein the transceiver is configured to provide a root certificate authority (CA) certificate of the TSP to the server of the manufacturer during the secure certificate exchange for storage on the electronic device and verification of the TSP.

14. The system of claim 11, wherein the information in the message is encrypted using a unique session key and the unique session key is encrypted using the TSP encryption public key.

* * * * *